United States Patent
Tarabula

(10) Patent No.: US 6,916,436 B2
(45) Date of Patent: Jul. 12, 2005

(54) METHOD FOR PRODUCING QUASI-THREE DIMENSIONAL IMAGES

(76) Inventor: Michael Tarabula, 3056 Park La., Chamblee, GA (US) 30341

( * ) Notice: Subject to any disclaimer, the term of this patent is extended or adjusted under 35 U.S.C. 154(b) by 456 days.

(21) Appl. No.: 09/793,454

(22) Filed: Feb. 26, 2001

(65) Prior Publication Data

US 2002/0117775 A1 Aug. 29, 2002

(51) Int. Cl.⁷ .............................................. B29C 51/10
(52) U.S. Cl. ...................... 264/40.1; 264/553; 264/554; 264/219; 264/320; 264/322
(58) Field of Search ................................ 264/554, 40.1, 264/553, 219, 320, 322

(56) References Cited

U.S. PATENT DOCUMENTS

| | | |
|---|---|---|
| 364,389 A | 6/1887 | Winkler |
| 615,025 A | 11/1898 | Hulbert |
| 1,428,698 A | 9/1922 | Loewenthal |
| 1,653,180 A | 12/1927 | Jalbert |
| 2,296,752 A | 9/1942 | Whetzel .................. 41/24 |
| 2,297,844 A | 10/1942 | Shoemaker .................. 88/24 |
| 2,468,731 A | 5/1949 | Borkland .................. 41/24 |
| 2,674,558 A | 4/1954 | Neugass .................. 154/95 |
| 2,870,558 A | 1/1959 | Fuller .................. 40/126 |
| 3,093,918 A | 6/1963 | Krakauer et al. .................. 40/126 |
| 3,324,574 A | 6/1967 | Markley .................. 35/26 |
| 4,018,519 A | 4/1977 | Clapp .................. 352/89 |
| 4,076,398 A | 2/1978 | Galbraith .................. 353/69 |
| 4,929,213 A | 5/1990 | Morgan .................. 446/97 |
| 5,009,626 A | 4/1991 | Katz .................. 446/391 |
| 5,040,005 A * | 8/1991 | Davidson et al. .................. 396/429 |
| 5,107,444 A * | 4/1992 | Wu .................. 345/419 |
| D341,380 S | 11/1993 | Moran, Jr. et al. .................. D20/37 |
| 5,345,705 A | 9/1994 | Lawrence .................. 40/616 |
| 5,483,307 A | 1/1996 | Anderson .................. 353/98 |
| 5,719,599 A * | 2/1998 | Yang .................. 345/587 |
| 6,023,872 A * | 2/2000 | Falkenstein, Sr. .................. 40/800 |

* cited by examiner

Primary Examiner—Edmund H. Lee
(74) Attorney, Agent, or Firm—The Halvorson Law Firm

(57) ABSTRACT

A method to transform any portion of a two-dimensional visual image into a three-dimensional formed visual image device within the overall two-dimensional visual areas on a single image piece is provided. The resultant image has both two-dimensional and three-dimensional aspects in the same single image piece, or visual device. Furthermore, the present invention provides a method that offers fall control of the amount of visual distortion involved in the above processes.

8 Claims, 1 Drawing Sheet

METHOD FOR PRODUCING QUASI-THREE DIMENSIONAL IMAGES

FIELD OF THE INVENTION

The present invention relates to a method for producing quasi-three dimensional images, signs, or displays used for advertising or ornamental uses. More specifically, the present invention relates to a method of producing a visual device containing both two-dimensional and three-dimensional images within a single image piece.

BACKGROUND

Product advertising is a large and valuable component to our national economy. Advertising can take many forms from print media, radio and television commercials, billboards, decorative displays, vending machine fronts, and the like. Conventional signage used for advertising promotions and decorative displays have for the most part generally consisted of two dimensional placards, banners, posters, and the like. However, two-dimensional displays do not attract the same attention as a three-dimensional display and are not as visually stimulating.

There is a long history of ideas for creating three-dimensional and quasi-three-dimensional advertising. Generally, these ideas have consisted of painting or tinting a three-dimensional or quasi-three dimensional Known signs having a quasi three-dimensional display surface generally are painted or tinted after the quasi three-dimensional shape has been formed, and, therefore, are difficult and expensive to manufacture.

SUMMARY OF THE INVENTION

The invention relates to a method for manufacturing decorative, lightweight sign or display device having a visually stimulating quasi three-dimensional display surface. The quasi three-dimensional display or relief surface of the sign gives shape and definition to the products, objects, or content displayed, thus attracting the attention of casual viewers and inviting them to focus on and study the content and subject matter of the sign.

The sign produced by the present invention preferably comprises a rigid plastic display sheet that is formed to have desired three-dimensional features or contours. The space between the contoured display sheet and the backing can be filled with a foamed plastic material having a sufficient rigidity to provide support and dimensional stability for the display surface. The sign is lightweight and relatively inexpensive to fabricate, making it ideally suited for use as a temporary display as for sales, promotions, or seasonal decorations.

The display sheet can be transparent, translucent, or opaque, as desired. Depending on what is desired, the display sheet can be clear, colored, or tinted. Written messages and other indicia can be printed directly on the inner or outer surfaces of the display sheet. Alternatively, written messages and other indicia can be printed on paper, cardboard, plastic, or other materials that are contained within the sign and viewable through a transparent display sheet or backing.

Optionally, the product produced by the method of the present invention can be provided with various features that will increase the noticeability of the sign and further enhance and intensify a viewer's interest therein, such as lighting means, audio means, or olfactory stimulus contained within the display.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

Figure 1:
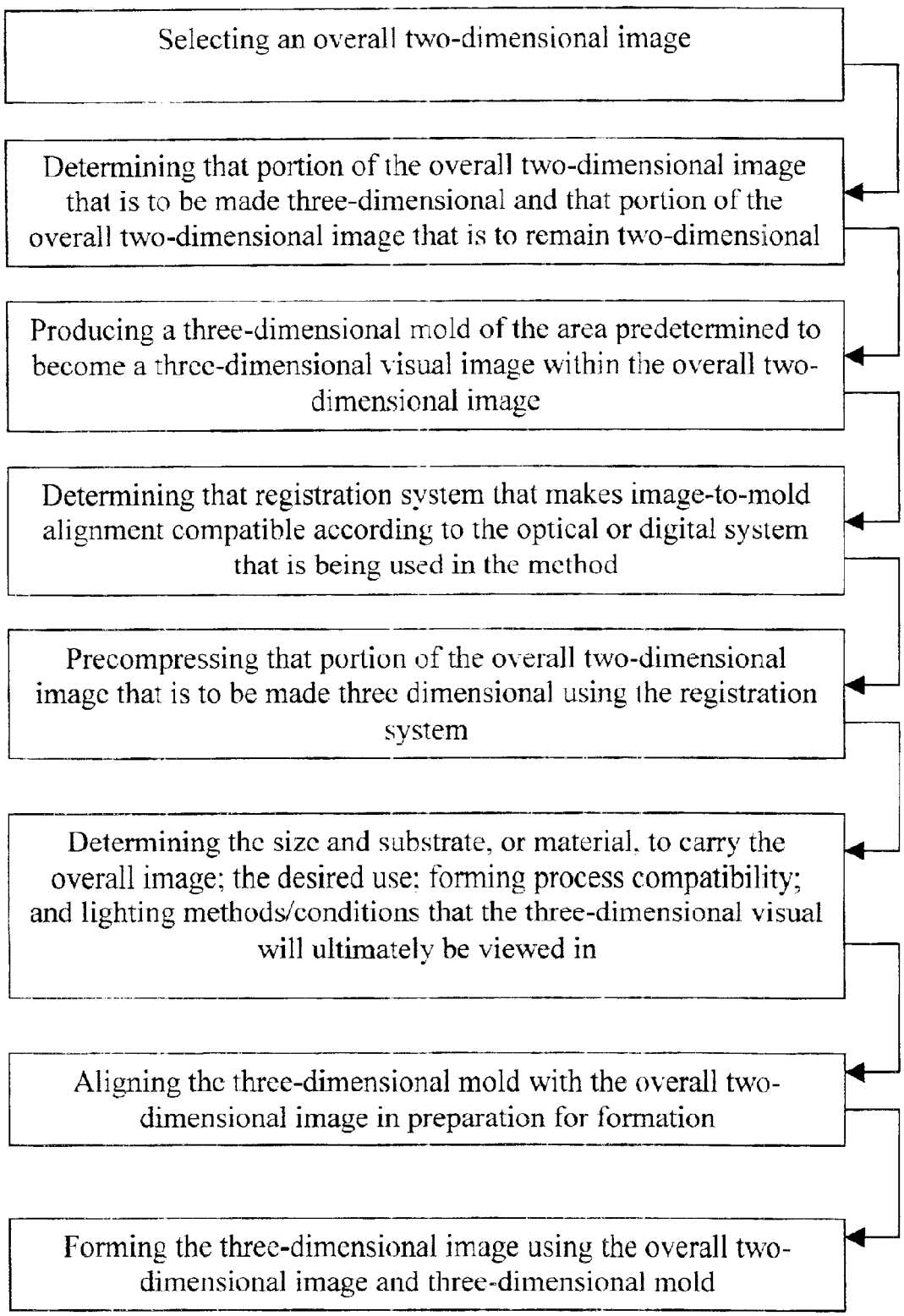
FIG. 1 is a flow chart of the method according to the present invention.

The present invention provides a method to transform any portion of a two-dimensional visual image into a three-dimensional formed visual image device within the overall two-dimensional visual areas on a single image piece. The product then has both two-dimensional and three-dimensional aspects in the same single image piece, or visual device. Furthermore, the present invention provides a method that offers full control of the amount of visual distortion involved in the above processes.

The method begins by selecting a two-dimensional image. A three-dimensional mold is produced representing the area of the image that is to become three-dimensional. This may be all or a portion of the selected image.

The two-dimensional image is then put into a digital format, either by scanning, digital photography, or like methods. The area of the two-dimensional image that is to overlay the three-dimensional portion of the product is then compressed, such as by digital means. The compression of the portions of the two-dimensional image yields a two-dimensional image with all or a portion of the image in a compressed or condensed state. This is called a negative compression because the forming process positively expands the compressed portion of the two-dimensional image into an uncompressed three-dimensional image form.

Without negative distortion control, or negative compression as described above, a stretched or molded visual image would be positively stretched or distorted starting from its original appearance to an expanded state.

Compression of the area of the two-dimensional image to be formed and the amount of compression/distortion is preferably performed using one or both of two processes: Selective Image Compression and Variable Distortion Control. The use of the Selective Image Compression and Variable Distortion Control processes allows for a variety of options and desired visual effects. The Selective Image Compression process involves the use and relationship between a positive and negative relief mold or the numeric relationship between the two. The Variable Distortion Control process controls the look of three-dimensional movement and the ability to render a portion of the three-dimensional visual in an undistorted state as if the morphosis was complete or not moving. The Variable Distortion Control process would be necessary in a case where a logo or design visual is to be reproduced within the three dimensional visual image but without appearing distorted.

More specifically, Selective Image Compression is compressing of only the portion of the overall two-dimensional image to be made three dimensional. This is the two-dimensional image areas that will be effected, or expanded, by the forming process. Without the Selective Image Compression method or process, the original logo and design form areas will be noticeably and undesirably distorted when formed onto the mold. The forming process actually stretches the two-dimensional image to conform to the mold, thus requiring precompressing the selected two-dimensional image area, or Selective Image Compression.

Variable Distortion Control is related to the positive mold and the amount or percentage distortion desired in the final visual device. The amount or percentage of two-dimensional image compression is related to the amount of distortion, or stretched look, that is desired in the final product. For example a two-dimensional image area desired to have a three dimensional undistorted appearance would require 100% negative image compression of that area only. 100% negative compression is required to render the image distortion free. Once the precompressed two-dimensional image area, being a 100% negative, is stretched by a 100% positive mold, the selected image area becomes 0% distorted. If, when compressing the preselected two-dimensional image portion, the image portion is compress to less than a 100% negative compression state, when the compressed image is formed onto the positive mold, the precompressed portion will be overly expanded thereby producing a positively stretched image that conveys the look of stretching movement of a continuing morphosis process. Likewise, a distorted, under-stretched appearance would required more than 100% negative two-dimensional image compression.

The Variable Distortion Control and Selective Image Compression can be achieved using various types of equipment, both optical and electronic digital. Although the result would be basically the same, the available equipment, production quantity and overall size may determine one method or a combination of, to be the preferred method for the desired visual effect. Below are described three basic example methods to manipulate the two-dimensional image for desired effects.

Method A: Using a rotating or moving electronic digital scanner, scan either the three-dimensional mold or the numeric values represented by a distorted grid created by forming a flat grid over the three dimensional positive mold. These numeric values represent the selected two-dimensional image areas to be compressed and the amount of compression. Since these numeric representations are in positive values, the output two-dimensional image would need to be compressed to negative values. Negative compression only applies to the two-dimensional image areas desired to be made three-dimensional. The flat areas would remain uncompressed, or have 0% negative compression, and would remain unaffected by the three dimensional forming process.

With the original visual two-dimensional image scanned into the digital or electronic system, it can then be compared to the amount of change needed to occur to bring reference points into co-alignment. This change is then applied to the selected portions of the digital two-dimensional image. This changed output two-dimensional image, with portions that have been negatively compressed, can be used to prepare final two-dimensional images to be heat formed.

Method B: From the positive mold, cast a negative mold. This will result in the flat two-dimensional areas remaining flat and the positive three dimensional areas becoming negative in relief. Position the negative mold and a projection device containing a flat grid or pattern so that the grid or pattern is projected on the negative mold through a beam splitter. Since the beam splitter is in proper alignment with the negative mold, a return image is directed to a recording device that records either the image or numeric values of the image. The recording device can be electronic, digital, or optical such as a camera, thus easily reading the negatively distorted areas. These negative readings can be used as in Method A, above. A camera film recording of the negatively distorted grid or pattern image can be digitized using a flat bed digital scanner.

Method C: An optical photo method setup similar to Method B, above, except the projector contains an original transparency image thus projecting it onto the negative mold through the beam splitter and further to the recording device, which would be a camera with color film or a digital electronic device. The resulting two-dimensional image automatically contains optically compressed image areas that will ultimately be formed into a three-dimensional shape.

For forming, the altered, or compressed two-dimensional image is then printed onto a stock, such as plastic or the like. The printed stock is then aligned with the mold such that the compressed portion of the image overlays the three-dimensional portion of the mold. The stock, with the printed compressed two-dimensional image, is then three-dimensionally formed, such as by heat formation, vacuum formation, or other like methods, to the three-dimensional mold. This results in the compressed two-dimensional image areas stretching over the projecting area of the mold, thereby uncompressing the two-dimensional image back to its original unaltered state by conforming to the aligned three-dimensional mold. The completed formed quasi three-dimensional image is then removed from the mold. The result is a quasi three-dimensional image that is all or partially three-dimensional in nature.

When the three-dimensional image is produced on translucent film with translucent ink, it can be back or underlit. Additionally, this technique can result in a 360° image that is capable of having internal lighting.

More specifically, a preferred embodiment of the above described invention is further elaborated below.

The first step of the method according to the present invention is choosing, or selecting, a two-dimensional image, such as a photo or the like or a portion thereof, having an area suited for a desired three-dimensional and/or morphosis effect.

The second step of the method according to the present invention is determining that portion of the overall two-dimensional image that is to be made three-dimensional and that portion of the overall two-dimensional image that is to remain two-dimensional. Also at this time, an additional step may be added, the step of determining any portions of the overall two-dimensional image that is to appear distorted (ether positively or negatively), or stretched, after forming thereby depicting three-dimensional movement or continuing morphosis (the frozen in time effect).

The third step of the method according to the present invention is producing a three-dimensional positive mold, or similar relief, of the area or portion predetermined in the second step to become a three-dimensional visual image within the two-dimensional image area. A positive mold is one in which the three-dimensional area of the mold is in the form of the ultimate display. Thus, when forming a display, the stock is formed onto the outer surface of the mold. Contrast this to a negative mold wherein the stock is formed onto the inner surface of the mold. Alternately, this step may be accomplished at any time prior to the final display forming step.

The fourth step of the method according to the present invention is the step of determining that registration system that makes image-to-mold alignment compatible according to the optical or digital system that is being used in the method.

The fifth step is precompressing the portions of the overall two-dimensional image that is to be made three dimensional using the registration system selected above.

The sixth step is determining the size and substrate, or material, to carry the image; the desired use; forming process compatibility; and lighting methods/conditions that the three-dimensional visual will ultimately be viewed in. Factors such as front/back lighting or a combination of, indoor/outdoor and durability requirements should be considered. One example for indoor three-dimensional visual may require a less durable material such as a photographic display material, shrink wrap or other electronic printer output materials. Outdoor use may require a more durable material such as impact resistant plastic with the prepared image screen printed on the back side. The use or purpose of the three-dimensional visual image will determine the best production method with all factors considered.

The seventh step is aligning the three-dimensional mold with the flat screen printed sheet plastic material in the heat/vacuum forming equipment.

The eighth step is forming the actual display. The two-dimensional image areas previously negatively compressed become uncompressed by forming the mold to a positive three-dimensional relief mold. The two-dimensional image areas not in contact with the three-dimensional relief mold area (or the flat mold areas) will remain in two-dimensional. The result will be a single visual piece containing three-dimensional raised visual images within a two-dimension visual field. The three-dimensional image or objects would appear to morph out of the overall two-dimensional image areas.

The rigid plastic display sheet is preferably polycarbonate and/or polyvinyl chloride (PVC), but other formable rigid plastics can also be used. A suitable starting thickness for the rigid plastic display sheet is typically about 0.020 inch. Contours produced in the forming process can include raised portions that resemble an article, such as a product or a container, or raised lettering. The display sheet is preferably clear or transparent, but can be tinted, translucent, or opaque. Written messages and other indicia can be applied directly to the inner or outer surfaces of the display sheet. Multiple printing operations can be utilized to provide multiple color designs. Foamed plastic having sufficient rigidity is preferably disposed within the void spaces of the sign to help keep the printed sheets in proper position and to add dimensional stability and rigidity to the sign. The foamed plastic is preferably an expanded rigid polystyrene plastic, and can be cut, molded in situ, or molded separately to conform to the void space of the sign.

Optional lighting structures, such as a light-emitting diode connected to a power source by means of electrical conductors can be employed to visually enhance the sign's ability to attract a viewer's attention. Lighting means can be used in association with circuitry for regulating individual lights or a plurality of lights in timed sequences to further increase the attractiveness of the sign. The lighting means can be powered by an internal or external power source and can be provided with external control means. Another optional feature which adds to the ability of the sign to attract attention is audio means such as a speaker secured to an inside surface of the display sheet and electrically connected to a magnetic or digital audio record player. A plurality of miniature openings permits sound to pass from the speaker through the display sheet. Olfactory stimuli can also be used in association with the sign to enhance its attractiveness. For example, an odorized or scented pad can be secured to the inside surface of the display sheet. Adjacent miniature openings permit the scent from the pad to emanate from the sign and to be detected by a person in proximity to the sign.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for creating a quasi-three dimensional image starting from a two-dimensional image comprising the steps of:
   a. selecting an overall two-dimensional image,
   b. determining a portion of the overall two-dimensional image that is to be made three-dimensional and a portion of the overall two-dimensional image that is to remain two-dimensional,
   c. producing a three-dimensional mold of the area predetermined to become a three-dimensional visual image within the overall two-dimensional image, d. determining a registration system that makes image-to-mold alignment compatible according to either an optical or digital system that is being used in the method, e. precompressing a portion of the overall two-dimensional image that is to be made three dimensional using the registration system, f. determining the size and substrate, or material, to carry the overall image; the desired use; forming process compatibility; and lighting methods/conditions that the three-dimensional visual will ultimately be viewed in, g. printing the overall two dimensional image, including the precompressed portion onto the substrate, h. aligning the three-dimensional mold with the substrate with the printed overall two-dimensional image having a precompressed portion using the predetermined registration system, in preparation for three dimensional image formation, i. forming a three-dimensional image out of the substrate with the printed overall two-dimensional image having a precompressed portion using the overall two-dimensional image having a precompressed portion and three-dimensional mold.

2. The method according to claim 1 further including the step of determining any portions of the overall two-dimensional image that is to appear distorted after forming, said step occurring at approximately the same time as the step of determining that portion of the overall two-dimensional image that is to be made three-dimensional and that portion of the overall two-dimensional image that is to remain two-dimensional.

3. The method according to claim 1 wherein the step of producing a three-dimensional mold is the step of forming a positive mold.

4. The method according to claim 1 wherein the step of producing a three-dimensional mold is the step of forming a negative mold.

5. The method according to claim 1 wherein the step of producing the three-dimensional image is a method selected from the group consisting of heat formation and vacuum formation.

6. The method according to claim 1 wherein the step of precompressing that portion of the overall two-dimensional image that is to be made three dimensional using the registration system is scanning either a three-dimensional mold or numeric values represented by a distorted rid created by forming a flat grid over a three dimensional mold, comparing the amount of change needed to occur to bring reference points into co-alignment, and applying the compression to the selected portions of the overall two-dimensional image.

7. The method according to claim 1 wherein the step of precompressing that portion of the overall two-dimensional image that is to be made three dimensional using the registration system is the steps of making a negative mold from a positive mold, positioning the negative mold and a projection device containing a flat grid or pattern so that the grid or pattern is projected on the negative mold through a beam splitter, directing a return image to a recording device that records either the image or numeric values of the image, recording the image of the distorted grid or pattern, comparing the amount of change needed to occur to bring reference points into co-alignment, and applying the compression to the selected portions of the overall two-dimensional image.

8. The method according to claim 1 wherein the step of precompressing that portion of the overall two-dimensional image that is to be made three dimensional using the registration system is the steps of making a negative mold from a positive mold, positioning the negative mold and a projection device containing a transparency of the overall two-dimensional image so that the overall two-dimensional image is projected on the negative mold through a beam splitter, directing a return image to a recording device that records either the overall two-dimensional image or numeric values of the overall two-dimensional image, recording the return of the overall two-dimensional image that contains precompressed values of the selected portions.

* * * * *